United States Patent [19]

Sekmakas

[11] 4,005,052
[45] Jan. 25, 1977

[54] AQUEOUS POLYMERIZATION OF UNSATURATION CARBOXYLIC ACID MONOMERS USING ANIONIC SURFACTANT MIXED WITH THE MONOMER AND POLYHYDRIC ALCOHOL PRIOR TO REACTION

[75] Inventor: Kazys Sekmakas, Chicago, Ill.

[73] Assignee: DeSoto, Inc., Des Plaines, Ill.

[22] Filed: June 9, 1975

[21] Appl. No.: 585,039

[52] U.S. Cl. .................. 260/29.6 TA; 260/29.6 E; 260/29.6 H; 260/29.6 N; 260/29.6 SQ; 260/29.6 AT
[51] Int. Cl.² ........................................ C08L 25/14
[58] Field of Search ............ 260/29.6 TA, 29.6 E, 260/29.6 H, 29.6 N, 29.6 SQ, 29.6 AT, 80.8

[56] References Cited

UNITED STATES PATENTS

| | | | |
|---|---|---|---|
| 3,232,899 | 2/1966 | Guziak | 260/29.6 E |
| 3,804,881 | 4/1974 | Bassett et al. | 260/80.8 |
| 3,862,075 | 1/1975 | Sekmakas | 260/80 M |

Primary Examiner—M. J. Welsh
Attorney, Agent, or Firm—Dressler, Goldsmith, Clement, Gordon & Shore, Ltd.

[57] ABSTRACT

Monoethylenic monomers, including from about 1 to about 30% by weight of monoethylenic carboxylic acid, are placed in solution in a liquid mixture containing a low molecular weight polyhydric alcohol, and an anionic surfactant. This liquid mixture is dispersed in water and polymerized at an elevated polymerization temperature using agitation and in the presence of a free radical polymerization catalyst. The dispersion of polymer particles is then at least partially neutralized, preferably with ammonia or an amine to form an aqueous dispersion which is stable in the absence of emulsifying agent and which is useful in coating.

12 Claims, No Drawings

AQUEOUS POLYMERIZATION OF UNSATURATION CARBOXYLIC ACID MONOMERS USING ANIONIC SURFACTANT MIXED WITH THE MONOMER AND POLYHYDRIC ALCOHOL PRIOR TO REACTION

The present invention is an improvement on the aqueous copolymer dispersions and the production thereof disclosed in my prior application Ser. No. 258,890, filed June 1, 1972, now U.S. Pat. No. 3,862,075, granted Jan. 21, 1975, this improvement providing improved gloss and water resistance, and increasing the uniformity of particle size which is obtained.

In accordance with the disclosure of my said prior patent, monoethylenic monomers, including from about 1% to about 30% by weight of monoethylenic carboxylic acid, are placed in solution in a liquid mixture containing a low molecular weight polyhydric alcohol. This liquid mixture is dispersed in water and polymerized at an elevated polymerization temperature using agitation and in the presence of a free radical polymerization catalyst. The dispersion of polymer particles is then at least partially neutralized, preferably with ammonia or an amine to form an aqueous dispersion which is stable in the absence of emulsifying agent and which is useful in coating.

These dispersions have many advantages, as described in my prior patent, and they avoid many of the disadvantages of the known aqueous emulsion systems. Nonetheless, the advantages obtained are limited, and it is particularly desired to improve the gloss and water resistance which are obtained. Also, the prior process tends to produce some oversize particles. These can be eliminated by sand grinding the dispersion, or by using an ultra-centrifuge at high speed, but these techniques are costly, and it is desired to eliminate the need therefor by regulating the particle size of the dispersion which is produced.

In accordance with this invention, the water insoluble polyhydric alcohol component of my prior invention is combined in the liquid mixture with a small proportion of a water soluble anionic surfactant. The anionic surfactant causes the particle size to be more uniform and eliminates the production of oversize particles, and the use of very small amounts of the anionic surfactant permits excellent water resistance to be obtained. The more uniform particle size provides improved gloss and improved plant processing since pigment wetting problems are reduced. Interestingly, if the anionic surfactant, which is water soluble, is added to the aqueous phase, rather than to the liquid mixture of monomers and polyhydric alcohol, the product is entirely different. This different product is of much finer particle size, it is more viscous and poor flowing, and it is actually closer to a solution than to the desired large particle size dispersion.

The excellent water resistance apparently arises out of the improved film formation which results from the more uniform particle size and the superior wetting of the pigment.

As described more fully in said patent, it is normally desired to increase the stability of the dispersion to permit prolonged storage and this is done by at least partially neutralizing the copolymer, e.g., by adding a base to react with at least part of the acid content of the copolymer.

A small amount of volatile organic solvent, such as 2-ethoxy ethanol, may be added to the dispersion to assist particle coalescence on subsequent use, but this frequently is not required and, even when solvent is added, it is usually sufficient to employ less than 10% thereof, based on the weight of copolymer.

It will be noted that the monoethylenic monomers are the materials which are copolymerized, and all porportions herein are based on the total weight of such monomers, unless otherwise specified.

With usual monomer balances, the films are relatively soft and highly flexible, but monomer selection can be used to provide harder polymers of higher glass transition temperature. In normal practice in this invention, monomers are selected to provide a glass transition temperature of at least about 30° F. Also, a water dispersible aminoplast resin is preferably added to the dispersions of this invention, providing a curing potential for the formation of films of increased hardness and solvent resistance. Smaller proportions of the aminoplast resin are needed for cure herein than are required for solution copolymers, probably because of the higher molecular weight which is obtained from the dispersion polymerization.

Referring more particularly to the polyhydric alcohols which may be utilized in accordance with the invention, water insoluble tri- and tetrahydric alcohols having a molecular weight of from about 300 up to about 6000 may be used.

Preferred polyhydric alcohols are based on glycerin, trimethylol propane, and pentaerythritol. Polyethers formed by the reaction of propylene oxide with the trihydric or tetrahydric alcohol are particularly contemplated. Particularly preferred products are polyoxypropylene derivatives of glycerin, trimethylol propane, hexanetriol, or pentaerythritol having a molecular weight in the range of from 350 to 5000.

Caprolactone derivatives of the same polyhydric alcohols are also useful, particularly epsilon caprolactone derivatives of pentaerythritol or trimethylol propane.

The polyhydric alcohol referred to hereinbefore is employed in an amount of at least 0.5%, preferably at least 2%, based on the weight of the monoethylenic monomers which are to be copolymerized. These monomers are preferably free of any functional group which is reactive, under the conditions of polymerization, with the hydroxy groups in the polyhydric alcohol. Somewhat larger amounts of polyhydric alcohol can be used, e.g., 15 to 20%, and even larger amounts may be employed though this is not preferred since it is preferred to employ as little of the polyhydric alcohol component as is required to provide the liquid mixture which is employed in the polymerization process and to confer the stability in water dispersion which is ultimately desired. From 3–12% of polyhydric alcohol represents preferred practice, and up to about 50% is broadly tolerable.

The anionic surfactant is used in this invention in very small amount, namely, from about 1% to about 30% of the weight of the polyhydric alcohol, preferably from 2–15%. Anionic surfactants as a class are well known, and this invention will be illustrated using sodium dioctyl sulfosuccinate. Other anionic surfactants such as dodecyl hydrogen phosphate, methyl naphthalene sulfonate, sodium lauryl sulfate and sodium-2-acetamidohexadecane-1-sulfonate will further illustrate the class. The choice of anionic surfactant is not critical and largely dictated by the absence of water and solubility in the mixture of monomers and polyhydric alcohol.

The monoethylenic monomers are combined with the polyhydric alcohol to form a liquid mixture. The liquid nature of the mixture permits the same to be broken up by agitation with water in the reactor to thereby obtain the desired particle size, e.g., 0.5–5 micron. It will be appreciated that some of the monoethylenic monomers are themselves liquid, such as styrene, and the use of liquid monomer eases the burden of obtaining the desired liquid mixture. Also, the fact of dissolution is measured at polymerization temperature so that monomers like fumaric acid, which is poorly soluble at room temperature, can be used since it dissolves in the hot aqueous system at the time of polymerization. However, the polyhydric alcohol is preferably itself liquid at room temperature.

The monoethylenic monomers which are employed are subject to wide variation, all of the monomers customarily employed in acrylic copolymers being broadly useful herein. Thus, vinyl aromatic monomers, such as styrene and homologs thereof, such as vinyl toluene are highly useful herein, it being customary to balance such monomers which provide hard copolymers when homopolymerized with alkyl acrylates and methacrylates containing 2 or more carbon atoms in the alkyl group and which provide soft polymers when homopolymerized. Among the monomers which are particularly useful herein, in addition to those noted hereinbefore, are methyl methacrylate and acrylonitrile. Esters of acrylic acid or crotonic acid are particularly desirable such as ethyl acrylate, 2-ethylhexyl acrylate, dodecyl acrylate, butyl crotonate, and the like. Up to about 20% of total monomers may be polyethylenically unsaturated polyester as disclosed in U.S. Pat. No. 3,163,615.

It is important that from 1–30%, based on the weight of polymerizable monomers, be constituted by monoethylenic carboxylic acids. These are illustrated by acrylic acid, methacrylic acid, crotonic acid, maleic acid, fumaric acid, monobutyl maleate, and the like. Preferred proportions of the monoethylenic carboxylic acid are from 3–20%, on the same basis. If the acid is omitted, stability of the dispersion during polymerization and thereafter is unsatisfactory.

Other monomers of diverse type which may be included are described in my U.S. Pat. No. 3,862,075.

Out of an abundance of caution, it is noted in passing that the hydroxy group is used herein with its normal specific meaning denoting the alcoholic OH group, and this term does not include the N-methylol group or the phenolic OH group.

The polymerization which is employed in this invention is a simple one. The liquid mixture of monomers, polyhydric alcohol, and anionic surfactant is simply dispersed in water (preferably by adding the mixture in increments) with vigorous agitation and moderate heat is employed to cause a conventional free radical polymerization catalyst to release free radicals and stimulate or initiate the desired polymerization which is itself conventional. The catalyst may be benzoyl peroxide or the like dissolved in the monomers, but it is preferred to employ persulfates dissolved in the aqueous phase. Ammonium persulfate dissolved in the aqueous phase will be used to illustrate the invention. Hydrogen peroxide may also be used in the aqueous phase.

Catalyst proportion (0.1–5% of monomers) and reaction temperature (liquid phase preferably at 50° C. or higher, more usually 75°–100° C.) are both conventional. The polymerization is desirably carried out at a solids content of from 5–50%.

After the polymerization reaction is completed, the acidic copolymer is at least partially neutralized as previously noted. The final, at least partially neutralized copolymer dispersion desirably has a pH in the range of 5–11. Final solids are desirably in the range of 20–40% for conventional application, and from 2–20%, preferably 3–15%, for electrocoating use. At a given solids content, viscosity increases with pH so partial neutralization can be used to control viscosity. At least 5% neutralization, preferably 10–30% neutralization, helps to provide minimum viscosity. More extensive neutralization is preferred for greater stability and for electrocoat application.

The aminoplast resins which are desirably utilized herein are those which can be stably dispersed in water, and these are more fully illustrated in my said U.S. Pat. No. 3,862,075.

While 2–40% of the aminoplast resin, based on the total weight of resin, is broadly useful, preferred proportions are from 5–25%.

The aqueous dispersions of this invention can be applied in any desired manner, e.g., by spray, brush, roller coating or the like. Roller coating is particularly preferred since the dispersions of this invention, unlike ordinary emulsion systems, possess a greatly reduced tendency to foam, thus overcoming a major difficulty in roll coating. Also, pinholing, cratering, void formation, and the like, are greatly reduced as against the use of emulsions with surface active agents. Also, and as a result of larger particle size, the dispersions of this invention provide higher viscosity at given solids content in comparison with conventional emulsions so that thinner films can be easily applied. This is of especial value when it is appreciated that these thinner films provide the desired corrosion resistance which normally necessitates the deposition of much thicker films.

From the standpoint of cure, curing temperatures range from about 200° to 550° F. for periods of time ranging from about an hour at the lowest temperature to about 30 seconds at the highest temperature. Preferred baking temperatures are from 300° to 450° F.

The invention is illustrated in the following examples, in which all parts are by weight.

EXAMPLE 1

Procedure of Preparation (Charge Composition)

Parts by Weight
1700—Deionized water
4.7—Ammonium persulfate
  Charge into reactor and heat to 77° C. with agitation.
360—Styrene
330—Ethyl acrylate
45—Acrylic acid
75—Polyhydric alcohol (see Note 1)
20—50% dispersion of sodium dioctyl sulfosuccinate in ethylene glycol:
  Premix the above and add to the reactor over a 2 ½ hr. period at 77°–78° C. Hold for 45 minutes to complete the reaction. Cool to 65° C.
28—Dimethyl ethanol amine
90—Deionized water 120—2-butoxy ethanol:

Add the above over a 20 minute period. Cool to 35° C. and strain to provide a dispersion having the following characteristics:

Solids (percent)—30.1
Acid value (of nonvolatiles)—46.6
Color: milky dispersion

Note 1 — Liquid trihydric polyoxypropylene derivative of trimethylol propane having an average molecular weight of 2540, an hydroxyl number (KOH/g.) of 63, and a viscosity at 25° C. of 440 centipoises.

Evaluation of Dispersion of Example 1

The dispersion of Example 1 was blended with water soluble hexamethoxymethyl melamine resin to provide a ratio of acrylic dispersion solids to hexamethoxymethyl melamine resin solids of 63 to 37. The coating composition so-provided was then applied to aluminum panels using a wound wire rod to deposit wet coatings having a thickness of 0.7 mil. The coated panels were baked in an electric oven at 475° F. for 60 seconds to cure the same. The cured panels exhibited the following properties:

Pencil hardness: — F
Impact (forward 60 in./lb.) — Pass
Flexibility (⅛ in. mandrel) — Excellent
Discoloration or yellowing: — None
Gloss (60° Glossmeter) — 82
Water resistance test:
  120° F. water soak for 4 weeks
  Initial pencil hardness: — F
  After 4 weeks at 120° F. water soak: — HB In contrast, and in the absence of the small amount of anionic surfactant utilized, the initial pencil hardness is only HB, the gloss usually varies in the range of 60–70, and after 4 weeks in the water soak test at 120° F., the hardness usually degrades to B.

From the standpoint of commercial practicality, the results in the absence of the anionic surfactant are good, but the improvement provided by the presence of the anionic surfactant yields excellent results in which the aqueous dispersion of this example is considered to be fully comparable to corresponding solvent-based coatings.

The invention is defined in the claims which follow.

I claim:

1. A method of producing a dispersion of copolymer particles in water comprising, forming a liquid mixture of monoethylenic monomers and from 2% up to about 50%, based on the weight of said monomers, of water insoluble polyhydric alcohol selected from trihydric alcohols and tetrahydric polyhydric alcohols, said polyhydric alcohol having a molecular weight of from 300 up to about 6000, said mixture including from 1–30% of anionic surfactant, based on the weight of said polyhydric alcohol, said monomers including from about 1 to about 30% by weight of monoethylenic carboxylic acid, dispersing said mixture in water to form a dispersion, said dispersion including a free radical polymerization catalyst, subjecting the dispersed liquid mixture in said dispersion containing the said catalyst to agitation at an elevated polymerization temperature, with said monomers being in solution in the dispersed mixture, until polymerization of said monomers has been completed and copolymer particles have been formed, and then neutralizing at least 10% of the acidity in said copolymer particles with a base.

2. A method as recited in claim 1 in which said base is an amine and neutralization is carried out to provide a dispersion having a pH in the range of 5–11.

3. A method as recited in claim 1 in which said polyhydric alcohol is employed in an amount of from 2–20%.

4. A method as recited in claim 1 in which said polyhydric alcohol is a polyoxypropylene adduct of a trihydric or tetrahydric alcohol.

5. A method as recited in claim 1 in which said polyhydric alcohol is a lactone derivative.

6. A method as recited in claim 4 in which said polyoxypropylene derivative has a molecular weight in the range of from 350 to 5,000.

7. A method as recited in claim 1 in which said polyhydric alcohol is employed in an amount of from 3–12%, said monoethylenic carboxylic acid is present in an amount of from 3–20% of the weight of monoethylenic monomers, and said anionic surfactant is used in an amount of from 2–15%, based on the weight of the polyhydric alcohol.

8. A method as recited in claim 1 in which said monoethylenic monomers carry functional groups other than the carboxyl group, said other functional groups being selected from the hydroxy group, the amido group, the methylol group, and the amino group.

9. A method as recited in claim 1 in which said catalyst is dissolved in the water.

10. A method as recited in claim 9 in which said catalyst is a persulfate.

11. A method as recited in claim 1 in which said anionic surfactant is a 50% dispersion of sodium dioctyl sulfosuccinate in ethylene glycol.

12. The product of the method of claim 1.

* * * * *